United States Patent [19]

Scharfman

[11] 4,043,317

[45] Aug. 23, 1977

[54] VENTED SOLAR COLLECTOR

[75] Inventor: Howard Scharfman, Lexington, Mass.

[73] Assignee: Raytheon Company, Lexington, Mass.

[21] Appl. No.: 702,179

[22] Filed: July 2, 1976

[51] Int. Cl.² .............................................. F24J 3/02
[52] U.S. Cl. .................................. 126/270; 126/271;
[58] Field of Search ................ 126/270, 271; 237/1 A
165/48, 81, 49, 82, 18, 83

[56] References Cited

U.S. PATENT DOCUMENTS

| 3,254,643 | 6/1966 | Thomason | 126/271 |
|---|---|---|---|
| 3,902,474 | 9/1975 | Pyle | 126/271 |
| 3,943,911 | 3/1976 | Yu | 126/271 |
| 3,949,732 | 4/1976 | Reines | 126/271 |
| 3,995,614 | 12/1976 | Cerra et al. | 126/271 |

Primary Examiner—Kenneth W. Sprague
Assistant Examiner—James C. Yeung
Attorney, Agent, or Firm—Harold A. Murphy; Joseph D. Pannone; John T. Meaney

[57] ABSTRACT

A solar collector of the type embodying a collector plate with fluid conduits disposed in heat-conductive relation to the plate, and a transparent cover spaced above the plate-conduit assembly, with venting devices being provided in opposite end portions of the assembly for permitting cool air circulation within the space between the plate and cover to maintain the temperature of the collector below an established level.

8 Claims, 9 Drawing Figures

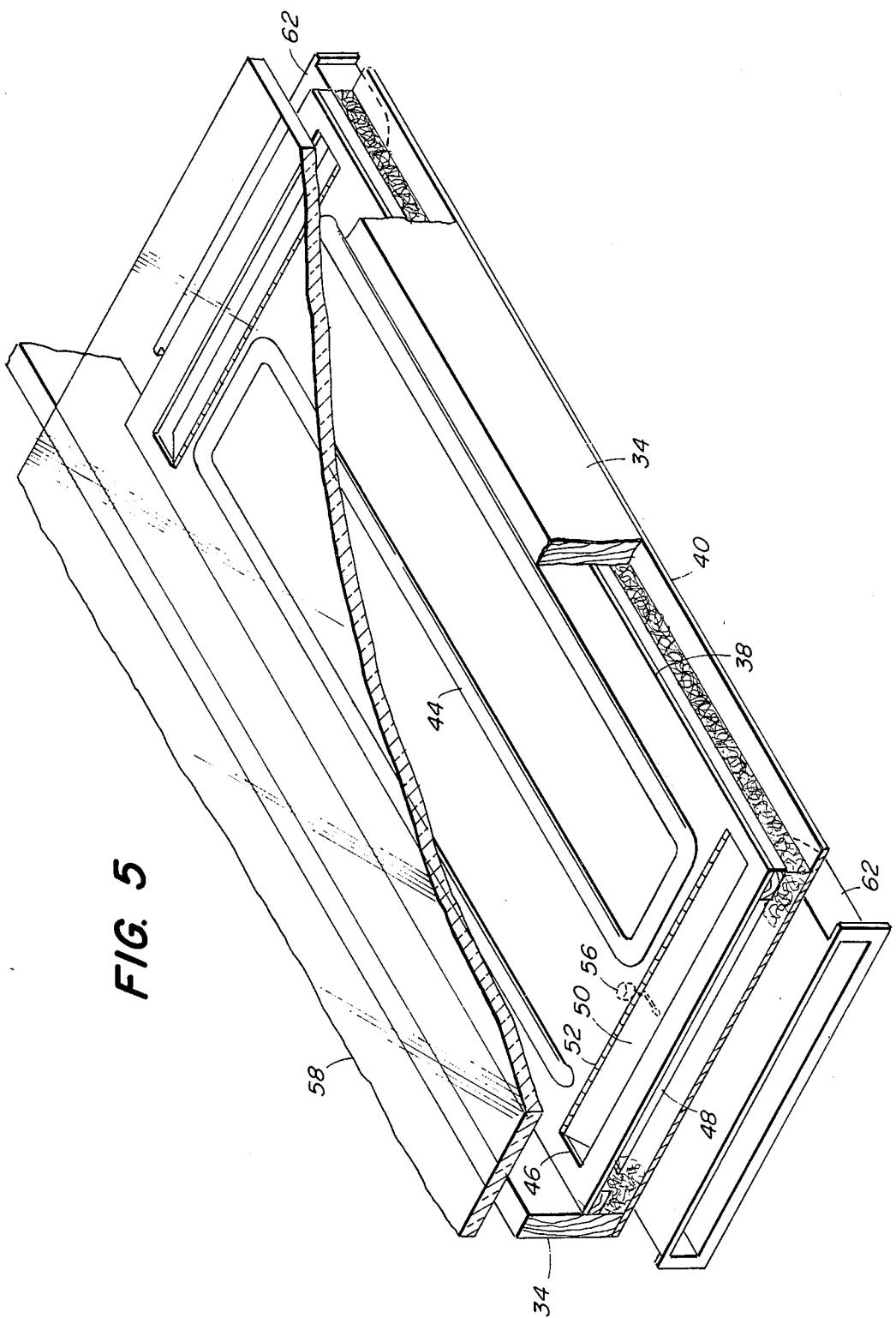

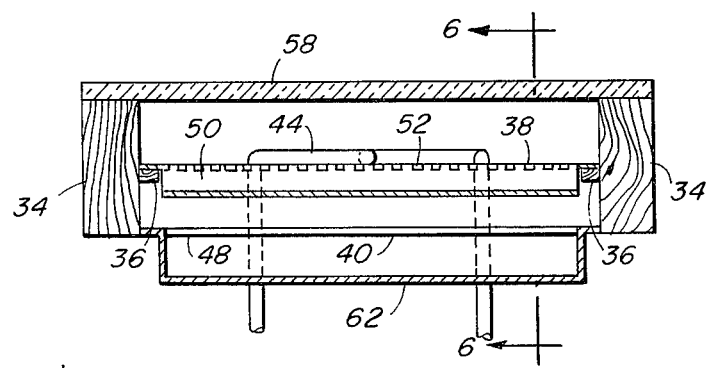
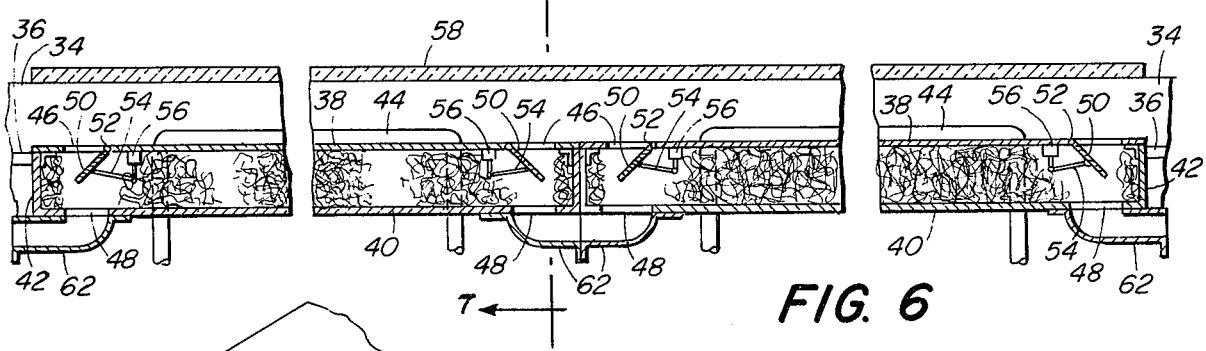
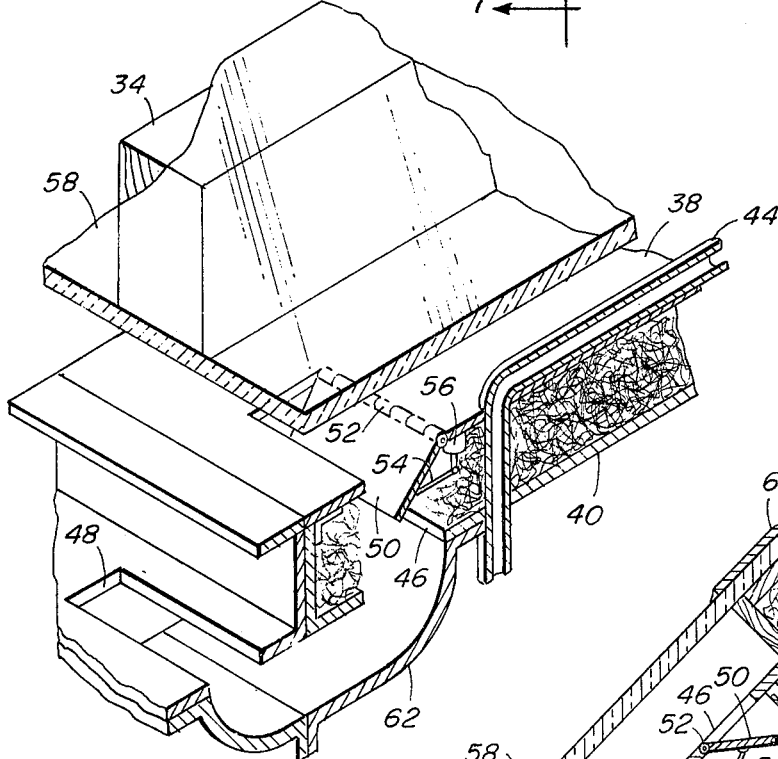
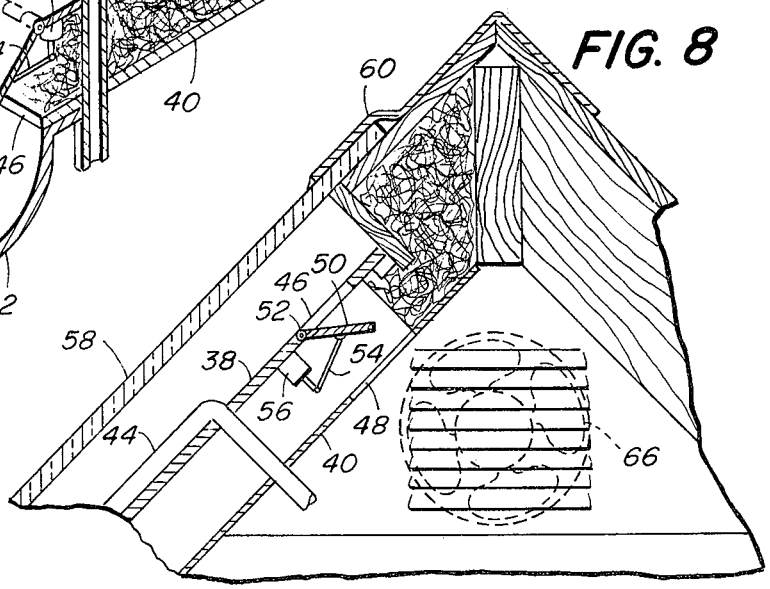

VENTED SOLAR COLLECTOR

BACKGROUND OF THE INVENTION

Solar collectors comprising a collector plate upon which a grid of fluid conduits is disposed in efficient heat-conductive relation and disposed in spaced relation beneath one or more transparent covers have been used to collect solar energy for space and hot water heating as well as air conditioning.

Some prior art collectors of this nature may be mounted in a frame or enclosure with sufficient insulation to minimize heat losses. Such units may be conveniently mounted on a roof or other supporting structure so as to be subjected to solar radiation. Other collectors are designed to be integral with the roof structure of a house or other building, in which case the collector plates may be mounted between the rafters, and the transparent cover is attached to the top edges of the rafters in covering relation to one or a plurality of collector plates. In such installations insulation is applied at the back of the collector plate between it and the attic space.

In normal operation of solar collectors of this type, fluid such as water is made to flow through the grid of conduits which, as stated above, are in good thermal contact with the collector plate. The collector plate is made efficient for solar energy adsorption such as by painting it black, and as a result of such absorption the temperature of the collector plate will increase and consequently the water flowing through the conduits will be heated. The heated water can then be used for space or hot water heating, as desired.

It has been found that if the flow of fluid is reduced the incremental temperature of the fluid, as it passes through the grid of conduits, will increase. If the flow of fluid should cease, the collector plate, conduits, and fluid within them will heat up to a temperature limited by the re-radiation from the collector plate. In present solar energy collector designs the collector plate, with no fluid flow or with conduits empty of fluid, can reach temperatures of more than 350° F (about 177° C).

Such high temperatures place extreme thermal stress on the components and materials of which the solar collectors are made. This may arise, for example, from the different thermal expansion coefficients of the materials used, resulting in breakdown of bonds and joints and outgassing of the materials in the collector. In addition, if the fluid in the conduits vaporizes, the resultant pressure may be sufficient to force leaks or even rupture or explode the conduits and joints. Excessively high temperatures for lengthy periods of time may also break down plastic materials and wood, and may even result in charring or burning of adjacent combustible materials.

Excessive heating of a solar collector plate can arise from many system failures. These include electrical power outage, pump failure, failure of circulation systems caused by leaks or blockage or failure of the control system. Since a serious or even catastrophic failure of a solar collector due to excessive heating could result from any of the above failure modes, it becomes important to build in a protective system for the collector to prevent overheating.

SUMMARY OF THE INVENTION

The above and other objections to and disadvantages of prior art solar collectors are overcome by the present invention wherein a solar collector is provided with means for automatically air venting the interior of the collector when the temperature of the collector plate exceeds a precribed level. Such air venting cools the collector plate without subjecting the interior of the collector directly to the atmosphere by breaking the seal of the cover. According to the invention, the valving system for the air vents may be operated directly by the heat generated in the collector plate or by energization from an auxiliary battery or other electrical source.

In carrying out this invention a module type or an integrated roof-type collector is provided with weatherproof venting by the provision of apertures in the collector plate near the upper and lower ends thereof, which apertures or vents are normally closed by hinged baffles or by integral bendable portions of the plate. The vents communicate with the exterior atmosphere either by themselves or by hoses or air ducts.

Below the selected actuating temperature $T_o$ the vents will remain closed and the air in the space between the collector plate and the transparent cover will remain substantially stationary. If for any reason the collector plate temperature exceeds $T_o$ the upper and lower vents will automatically open by means of bimetallic, valve-type, or other thermostatic devices directly actuated by the collector plate temperature or by means of a temperature sensor attached to the collector plate which signals for actuation of the vents.

BRIEF DESCRIPTION OF THE DRAWINGS

The above and other objectives and advantages of the invention will become apparent from the following description taken in connection with the accompanying drawings, wherein:

FIG. 5 is an isometric view partly fragmentary of a solar collector integrated into the roof of a building;

FIG. 6 is a longitudinal sectional view through a pair of adjacent integrated collectors of the type shown in FIG. 5 and taken substantially on line 6—6 of FIG. 7 looking in the direction of the arrows;

FIG. 7 is a horizontal sectional view through the integrated collector shown in FIG. 5 taken substantially on line 7—7 of FIG. 6 looking in the direction of the arrows;

FIG. 8 is an enlarged view in section of a portion of an integrated collector mounted in a building; and FIG. 9 is an enlarged fragmentary isometric view partly in section of an integrated collector showing particularly the duct means for interconnecting one collector to an adjacent collector.

DESCRIPTION OF THE PREFERRED EMBODIMENTS

Figure 1:
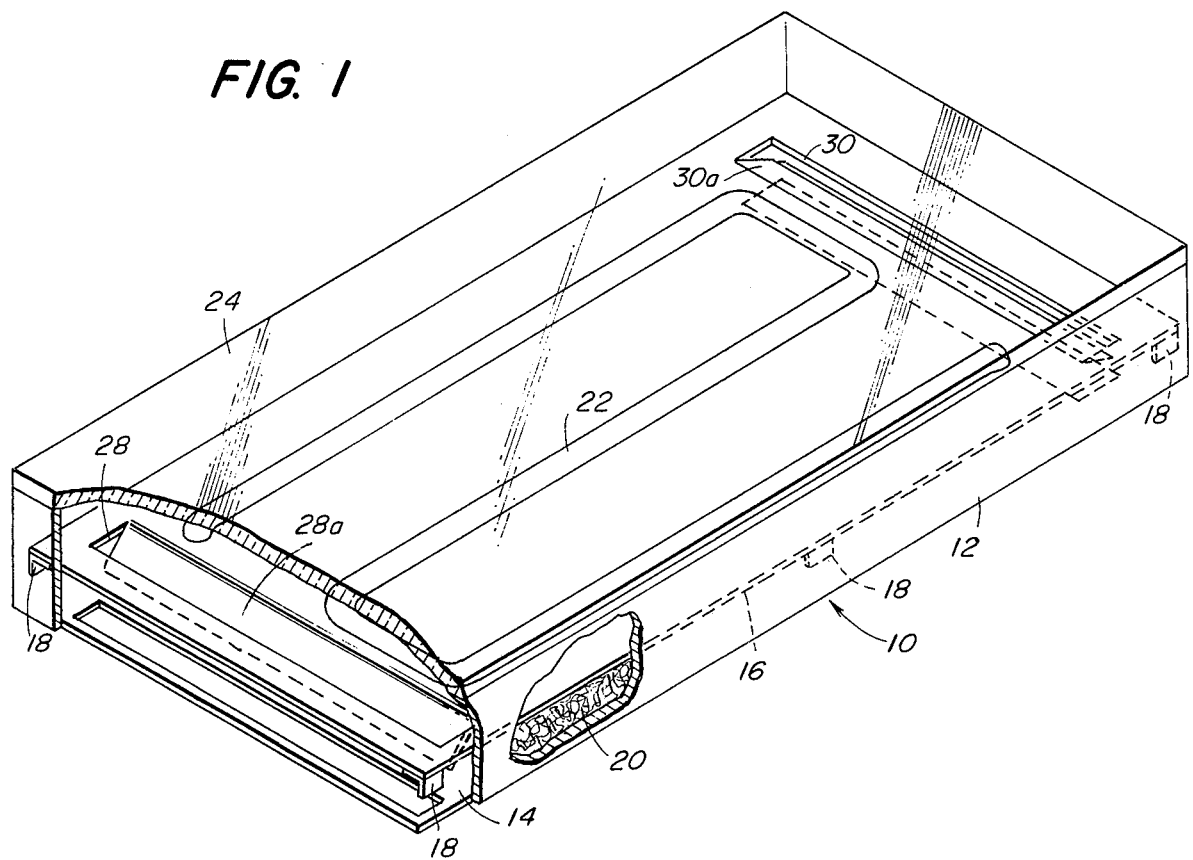
FIG. 1 is an isometric view partly fragmentary of a module type solar collector having the automatic venting means of the invention.

Referring more particularly to the drawings, the module type solar collector 10 shown in FIG. 1 comprises a relatively flat box-like cabinet or enclosure 12 made of rigid material such as sheet metal, plastic or wood and having an open top. Within the enclosure and extending substantially parallel with the enclosure bottom 14 is a collector plate 16. Collector plate 16 is supported as by brackets 18 upon the side walls of the enclosure in spaced relation with the enclosure bottom 14 and the space therebetween is filled with fiberglass or other suitable heat insulating material 20.

The collector plate 16 is made of copper, aluminum or other suitable heat conductive metal sheeting and may be made of a single large sheet or a plurality of small sheets disposed in a substantially common plane.

A grid 22 of fluid conduits such as copper tubing, for example, is mounted upon a surface of the collector plate 16 in good heat conductive relation with it. The grid may be secured by brazing, welding or cementing or by some mechanical means such as brackets or by being disposed within tightly fitting grooves, as is well known. The ends of the grid 22 extends out through the bottom or side wall of the enclosure and are connected to a fluid supply system (not shown) whereby a fluid such as water may be circulated through the tubing. Across the top opening of the enclosure 12 is disposed a cover 24 of glass, plastic or similar material which is transparent to solar radiation. One, two, or more such transparent covers may be used, as desired, and serve with enclosure 12 to complete the entire encasement of the collector plates.

Figure 2:
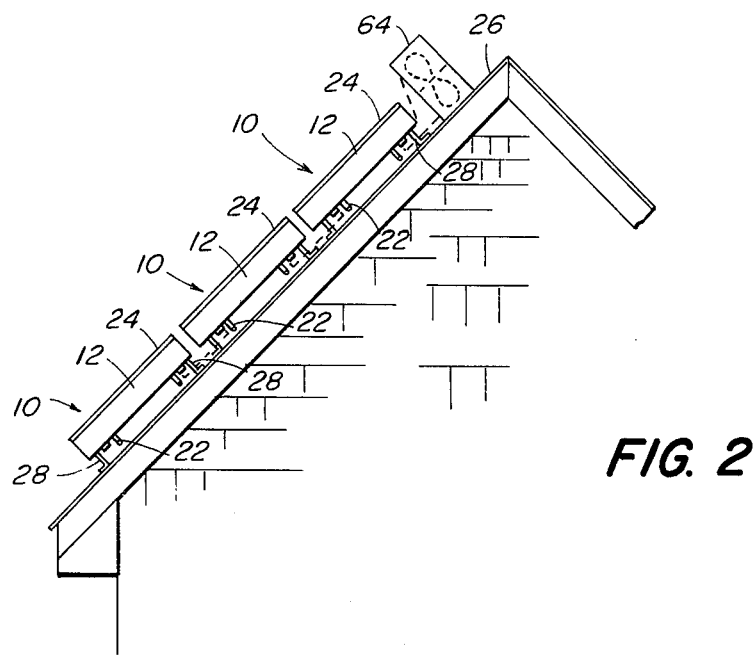
FIG. 2 is an elevational view showing a battery of module type solar collectors on a roof.

As shown in FIG. 2, one or more of such module type collectors may be supported upon a roof 26 or other structure as by brackets 28 or the like so that the transparent covers are exposed to solar radiation. The collector plate 16 will intercept radiation passing through the cover 24 and is preferably painted black or otherwise treated so as to be enabled to absorb a maximum amount of radiation.

The collector plate 16 will thus become heated and will transfer heat through the tubing 22 to the circulating fluid, heating the fluid in the well known manner of devices of this character.

It has been found that if inefficiency or failure occurs in the fluid circulation system, excessive heat will be built up in the collector plates sufficient to possibly cause resultant damage to the collector or to adjacent structures. To avoid this in accordance with the present invention these is provided thermally responsive air venting means to retain the temperature of the collector plate below such undesirably high temperatures.

Figure 3:
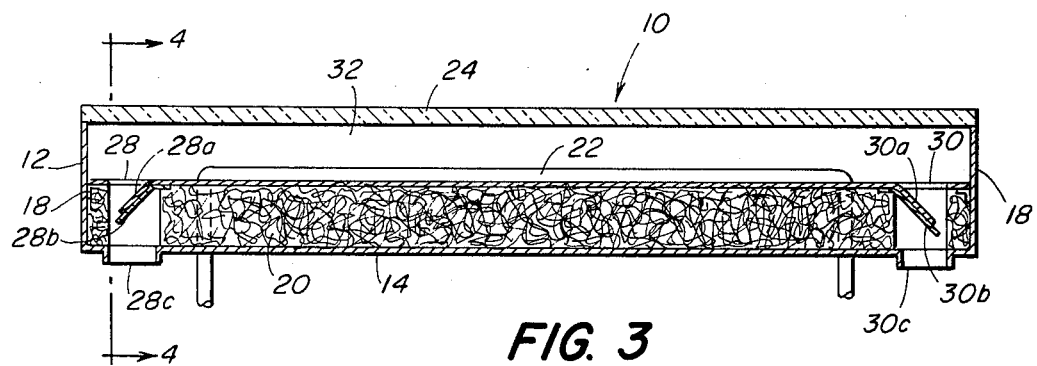
FIG. 3 is a longitudinal sectional view through the collector of FIG. 1 taken substantially on line 3—3 of FIG. 4 looking in the direction of the arrows.
Figure 4:
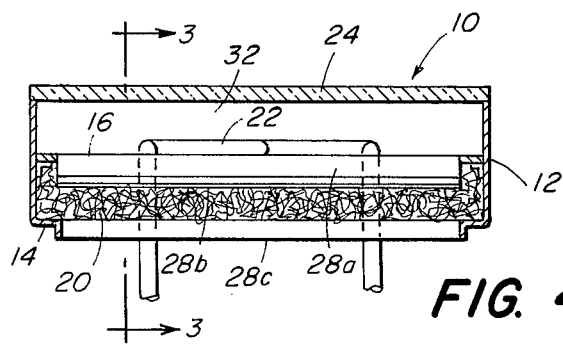
FIG. 4 is a horizontal sectional view through the collector of FIG. 1 taken substantially on line 4—4 of FIG. 3 looking in the direction of the arrows.

This is achieved by providing a lower vent 28 and an upper vent 30 in the collector plate 16 near its respective ends. The vents 28 and 30 are normally closed by respective flaps 28a and 30a which may be formed integral with the plate 16 as stamped out portions thereof as shown in FIGS. 1 3 and 4, or may be made separately and hinged to the plate as will be described hereinafter in connection with the description of FIGS. 5-9. The flaps 28a and 30a are of a size to completely close the respective vents 28 and 30.

Fixedly secured to the under side of each flap 28a and 30a is a respective member 28b and 30b (FIGS. 3 and 4) made of a member having a higher coefficient of expansion than the metal of which the flaps are formed. Thus, each member 28b and 30b forms with its respective flap 28a and 30a, a bimetallic element which, when heated, will bend downwardly as shown in FIGS. 1, 3 and 4, opening the respective vents 28 and 30.

Beneath each vent the enclosure bottom 14 is apertured as shown at 28c and 30c. Thus it will be apparent that when the temperature of the collector plate 16 rises above a predetermined level for which the bimetallic flap elements are set, the members 28b and 30b will cause the flaps 28a and 30a to be lowered, opening the vents 28 and 30.

This will permit cool air to rise through aperture 28c and vent 28 into the space 32 between the transparent cover 24 and collector plate 16, with heated air simultaneously passing out of the space 32 through vent 30 and aperture 30b. Since the bimetallic elements will be operable at a predetermined temperature level, such as 180° F, for example, this will permit the temperature of the collector, and particularly of the collector plate 16, to be maintained at a safe level. Subsequent cooling of the collector plate 16 will cause a reverse action of the bimetallic elements, causing the flaps 28a and 30a to close the respective apertures 28 and 30.

Referring to the integrated type collector shown in FIGS. 5-9, such a collector is adapted to be mounted between rafters 34 which form a part of the roof structure of a building. The sides of adjacent rafters 34 are provided with ledges 36 FIG. 7) upon which the sides of a collector plate 38 rest whereby the effective parts of the device are supported in position of use between the rafters 34.

Spaced beneath the collector plate 38 is a base plate 40 having upturned ends 42 suitably attached to the bottom of the collector plate as shown best in FIGS. 6 and 7. Fluid conduits 44 are attached to the surface of the conductor plate 38 as described in connection with the embodiment of FIG. 1 and the ends thereof extend downwardly into the building for connection in a suitable manner to a system for circulating fluid such as water through the conduits.

Near each end thereof the collector plate 38 is provided with horizontally extending vents 46, and beneath each vent 46 the base plate 40 is provided with a cooperating aperture 48. A flap 50 is connected to the inner edge of each vent 46 by hinges 52 so as to normally close the respective vents 46. However, each flap is operatively connected by an operating arm 54 to a respective thermostat 56 conveniently mounted directly upon the under side of the collector plate 38 where it may be operatively affected by the temperature of the collector plate.

A transparent cover 58 is disposed above the collector and may be conveniently affixed to the outer edges of the rafters 34 so as to be maintained in spaced overlying relation to the collector plate 38. Suitable flashing 60 may be used to secure the edges of the cover.

Thus, when solar radiation passes through the transparent cover 58 it will engage the collector plate 38. This causes the temperature of the collector plate to be raised and the heat therefrom will be transmitted through the walls of the fluid conduits or tubing 44 to the circulating fluid, causing the fluid to become heated.

During this process the vents 46 are closed by the flaps 50. However, in the event that the temperature of the collector plate is raised to an undesirable predetermined level, the thermostats 56 will detect this and will consequently operate through arm 54 to move the vents 46 downwardly on the hinges 52, opening the vents 46. Thus, cool air will flow upwardly through the lower aperture 48 in the base plate 40, and through the lower vent 46 into the space between the collector plate 38 and the cover 58. Here the cool air will absorb some of the heat from the collector plate and will flow upwardly out of the collector through the upper vent 46 and aperture 48, into the interior of the building.

When the collector plate 38 has become sufficiently cooled, the lower temperature will be detected by the theromstats 56 which will operate to return the flaps 50 again into closing relation to the vents 46.

Two or more such integrated collectors may be placed end-to-end between the same rafters 34. In such a case gutter-like air deflectors 62 may be located if desired beneath adjacent apertures in adjoining collectors so that air may be made to flow out of the upper end of a lower collector into the lower end of an upper collector so as to provide a continuous flow of air upwardly through a plurality of collectors.

While collectors of the character described are designed to operate efficiently in most locations, in some instances it may be desired to increase even more the cooling efficiency of a collector or group of collectors. For example, the transparent covers are spaced above the collector plates at a distance usually of from 1 to 2 inches. Therefore, heat can build up to extremely high levels in areas subjected to long continuous periods of solar radiation.

Therefore, in accordance with this invention it is contemplated that fans or blowers will be utilized to forcefully move the cool air through the collectors or collector systems. For example, in the installation shown in FIG. 2, a blower unit 64 may be mounted at the upper end of a chain of collectors to forcefully draw air out of the upper collector. To achieve this special ducting between the adjacent collectors and between the topmost collector and the blower may be desired as shown by dotted lines in FIG. 2. It is to be understood that such a blower 64 may be used at the lower end of a collector or chain of collectors if desired to propel the air by pushing it instead of pulling it through the collector.

In an installation of integrated collectors as shown in FIGS. 6 and 8, an attic fan 66 in the building may be used to pull the air through the collectors, or a fan at the lower end of the lowermost collector may be positioned to propel cool air through the collectors, if desired.

It will be understood that either of the collector structures described may be provided with any suitable means for actuating the flaps to open and close the vents in accordance with this invention in response to thermal changes in the collector plates, and such means may be mechanically, electrically, or otherwise manipulated, as desired.

Accordingly, it will be apparent that all of the objectives of this invention have been achieved in the novel solar energy collectors shown and described. It will also be apparent that various modifications and changes in the structures shown and described may be made by those skilled in the art without departing from the spirit of the invention as expressed in the accompanying claims. Therefore, all matter shown and described is to be interpreted as illustrative and not in a limiting sense.

What is claimed is:

1. A solar energy collector comprising a solar radiation absorbing panel adapted to be positioned to intercept solar radiation and to be heated by absorption of such radiation, a fluid conduit disposed in heat-conductive relation to the panel, a cover transparent to solar radiation mounted over the panel in spaced relation with it, and temperature-responsive means at each end of the panel for providing controlled circulation of air over the surface of the panel to maintain the temperature thereof below a prescribed level, said means including apertures adjacent each end of the panel, and adjustable portions of the panel movable into and out of closing relation to the apertures.

2. A solar energy collector as set forth in claim 1 wherein a box-like enclosure encloses the sides and bottom of the collector and includes a base plate spaced beneath the radiation absorbing panel and having apertures therein located in communicating relation to respective apertures in the panel.

3. A solar energy collector as set forth in claim 2 wherein fan means is positioned adjacent one of said apertures for forcibly moving the air through the space between the panel and the cover.

4. A solar energy collector as set forth in claim 1 wherein said adjustable portions of the panel each is a baffle movably mounted in closing relation to a respective aperture in the panel, and thermally responsive means is disposed in heat-detecting relation to said panel for moving the baffles to open the apertures when the temperature of the panel exceeds said precribed level.

5. A solar energy collector as set forth in claim 6 wherein said thermally responsive means comprises a thermostat.

6. A solar energy collector as set forth in claim 4 wherein said baffles are hingedly connected to said panel and thermostats are mounted on the panel and are operatively connected to said baffles to move the baffles in response to variations in temperature of the collector plate.

7. A solar energy collector as set forth in claim 4 wherein said panel is a metal having a known coefficient of expansion, said baffles comprise integral portions of said panel, and said thermally responsive means includes a layer of metal disposed upon said baffles and having a coefficient of expansion different from that of the baffles and comprising therewith bimetal elements responsive to temperature changes in said panel.

8. A solar energy collector module as set forth in claim 1 wherein said panel is a metal having a known coefficient of expansion, said adjustable portions are integral portions of said panel, and said temperature-responsive means includes a layer of metal disposed upon said adjustable portions and having a coefficient of expansion different from that of the adjustable portions and comprising therewith bimetal elements responsive to temperature changes in said panel.

* * * * *